US 8,465,430 B2

(12) United States Patent
Kanda et al.

(10) Patent No.: US 8,465,430 B2
(45) Date of Patent: Jun. 18, 2013

(54) ULTRASONIC DIAGNOSTIC APPARATUS

(75) Inventors: Hiroshi Kanda, Tokorozawa (JP); Mitsuhiro Oshiki, Tokyo (JP); Ryuichi Shinomura, Higashimatsuyama (JP)

(73) Assignee: Hitachi Medical Corporation, Tokyo (JP)

( * ) Notice: Subject to any disclaimer, the term of this patent is extended or adjusted under 35 U.S.C. 154(b) by 1082 days.

(21) Appl. No.: 11/577,334

(22) PCT Filed: Oct. 11, 2005

(86) PCT No.: PCT/JP2005/018698
§ 371 (c)(1), (2), (4) Date: Apr. 16, 2007

(87) PCT Pub. No.: WO2006/041058
PCT Pub. Date: Apr. 20, 2006

(65) Prior Publication Data
US 2008/0064959 A1    Mar. 13, 2008

(30) Foreign Application Priority Data
Oct. 15, 2004  (JP) ................. 2004-300939

(51) Int. Cl.
*A61B 8/14*     (2006.01)
(52) U.S. Cl.
USPC ............... 600/459; 600/407; 600/437
(58) Field of Classification Search
USPC ..... 600/437, 443, 459, 472; 367/138; 73/584, 73/587, 589, 596, 597, 602
See application file for complete search history.

(56) References Cited

U.S. PATENT DOCUMENTS

| 7,087,023 | B2 * | 8/2006 | Daft et al. ............... 600/459 |
| 7,134,343 | B2 * | 11/2006 | Suzuki et al. ............. 73/655 |
| 2003/0048698 | A1 | 3/2003 | Barnes et al. |

FOREIGN PATENT DOCUMENTS

| JP | 2002-530145 | 9/2002 |
| WO | WO 03/011481 | 2/2003 |
| WO | WO 2004/075165 | 9/2004 |

OTHER PUBLICATIONS

Merriam Webster Online Dictionary, entry for superpose. www.merriam-webster.com/dictionary/superpose.*

* cited by examiner

*Primary Examiner* — Unsu Jung
*Assistant Examiner* — Daniel Huntley
(74) *Attorney, Agent, or Firm* — Antonelli, Terry, Stout & Kraus, LLP.

(57) ABSTRACT

An ultrasonic diagnostic apparatus is disclosed for improving the signal to noise ratio of a receiving system, and allowing demodulation processing of ultrasonic reflection signals at the transducer during the receive process. The ultrasonic diagnostic apparatus includes an ultrasonic probe which transmits and receives ultrasound to and from a subject, a transmitting unit which supplies driving signals to the ultrasonic probe, and a receiving unit which processes signals to be output from the ultrasonic probe and calculates diagnostic information regarding the subject. The ultrasonic probe is equipped with a receiving transducer having sensitivity which changes according to the level of bias voltage to be applied. The receiving unit is equipped with a modulated bias amplification unit which applies signals of bias voltage with modulated amplitude to the receiving transducer.

8 Claims, 8 Drawing Sheets

ULTRASONIC DIAGNOSTIC APPARATUS

CROSS-REFERENCE TO RELATED APPLICATION

The present application claims priority from PCT/JP05/18698 filed on Oct. 11, 2005, the contents of which are incorporated herein by reference in their entirety. The present invention relates to an ultrasonic diagnostic apparatus for obtaining diagnostic information regarding a subject to be examined.

TECHNICAL FIELD

Background Art

The ultrasonic diagnostic apparatus is to transmit ultrasound with an ultrasonic probe, receive ultrasound to be generated by the reflection of the ultrasound inside the body with the same probe, and provide tomographic images inside the body based on such reflected echo signals. Further, the ultrasonic diagnostic apparatus can provide information on the speeds or distribution of speeds of movement of a reflection source inside the body such as blood cells, based on the Doppler effects to be generated with the reflected ultrasonic signals.

In case that the ultrasonic diagnostic apparatus obtains information on speed and so forth based on the Doppler effects, the flow of processing the reflected ultrasonic signals in the receiving system progresses from the receipt by the ultrasonic probe, amplification to the input level of signal processing unit by the preamplifier, beam forming or Doppler demodulation at the signal processing unit and to the generation and display of images. Because the size of the wave transmission signals is restricted to prevent hazards such as thermal effects inside the body, the performance of this apparatus entirely depends on the signal to noise ratio of the receiving system. In the conventional ultrasonic diagnostic apparatus in which the noise level of the preamplifier connected with the probe is high, the performance of the demodulator for detecting Doppler effects was restricted virtually by the performance of the pre-amplifier. Partly because the specific bandwidth dealt with by the ultrasonic diagnostic apparatus is broad as 60 to 90%, it is difficult to improve the signal to noise ratio of the pre-amplifier. Accordingly, the reality is that the thermal noise inside the body and the thermal noise of the probe, which provide information on blood flow and so forth, are hidden in the noise generated by the pre-amplifier.

For the probe of the ultrasonic diagnostic apparatus, a piezoceramic element has been used. Further, a capacitive probe which may be produced by the thin film producing technology has been proposed in the Patent Document 1.
[Patent Document 1] U.S. Pat. No. 6,246,158B1

DISCLOSURE OF THE INVENTION

Object to be Achieved by the Invention

Since the signal to noise ratio of the receiving system of conventional ultrasonic diagnostic apparatuses was virtually controlled by the thermal noise of pre-amplifier of the signal processing unit, as aforementioned, it is desired to improve this ratio and raise sensitivity. If the signal to noise ratio can be improved, the information inside the living body contained in the ultrasonic reflection signals received by the probe may not be hidden in the thermal noise of the preamplifier and be detected. It will also become possible to visualize weaker signals than conventional ones, to detect a less amount of contrast medium and to detect a slower blood flow, for example of the peripheral vessels. Further, if the thermal noise itself inside the body, which is modulated by the movement of internal organs and the blood flow inside the body, can be detected, the signal to noise ratio of the ultrasonic diagnostic apparatus can be dramatically improved, and it will become possible to provide an ultrasonic diagnostic apparatus, which is much closer to the "Ultrasonic Stethoscope", an ultimate and ideal form of the ultrasonic diagnostic apparatus.

Attempts to reduce the noise level of the preamplifier by immersing it in cooling medium such as liquid nitrogen have been performed. However, as it is difficult to cool the probe unit which directly contacts the living body, no desired effect has been yet achieved. If the reduction of thermal noise of the pre-amplifier itself is difficult, the conventional flow of signals from the probe of ultrasonic diagnostic apparatus, pre-amplifier then to demodulation processing needs to be changed.

Further, it is described in the Patent Document 1 that a capacitive probe can be used for the ultrasonic diagnostic apparatus. However, it simply proposed the replacement of a piezoceramic transducer with a capacitive transducer, and does not disclose improvement of the signal to noise ratio of the receiving system.

The objects of the present invention are to improve the signal to noise ratio of the receiving system and to provide highly sensitive ultrasonic diagnostic apparatus.

Means for Achieving the Objects

In order to achieve the foregoing objects, the ultrasonic diagnostic apparatus according to the first embodiment of the present invention comprises an ultrasonic probe for transmitting and receiving ultrasound to and from a subject to be examined, a transmitting means for supplying driving signals to the ultrasonic probe, a receiving means for processing signals to be outputted from the ultrasonic probe and a display means for displaying subject-related diagnostic information (for example, blood flow rate, tissue tomographic images) which is constructed based on the received signals to be outputted from the receiving means. The ultrasonic probe has a transducer, whose sensitivity of transmitting/receiving ultrasound changes according to the bias voltage to be applied by superimposing the aforementioned driving signals. Further, the ultrasonic diagnostic apparatus is characterized in that a direct bias means for applying DC bias to the transducer and a modulated bias means for applying bias voltage signals modulated based on the driving signals to the transducers are provided.

Further, the ultrasonic diagnostic apparatus according to the second embodiment of the present invention comprises an ultrasonic probe for transmitting and receiving ultrasound to and from a subject to be examined, a transmitting means for supplying driving signals to the ultrasonic probe and a receiving unit for processing signals to be outputted from the ultrasonic probe and obtaining diagnostic information regarding the aforementioned subject. The ultrasonic probe is equipped with multiple transducers, whose receiving sensitivity changes according to the level of bias voltage to be applied. The receiving unit is equipped with a modulated bias supply unit which applies bias voltage signals with modulated amplitudes to the transducer.

In the ultrasonic diagnostic apparatus according to the first and second embodiments of the present invention, when the ultrasound reflected on the subject is received by the transducer, modulated bias voltage signals are applied to the transducer to modulate its sensitivity. By this, a certain demodulation processing (such as phasing processing or Doppler demodulation) can be applied to the ultrasonic reflection signals in the receiving process of receiving transducers. Therefore, although the probe is not equipped with electronic circuits for demodulation processing, it becomes equivalent to so-called probe mixing, that is a probe on which complicated electronic circuits for demodulation were implemented. Further, because the demodulation processing by the probe of the present invention is not affected by any influence such as thermal noise, which later arises due to the signal processing circuits of the receiving unit, even the weak signals can be contained to comprise diagnostic information. Consequently, a highly sensitive ultrasonic diagnostic apparatus is provided.

The frequency bandwidth of the modulated bias voltage signal shall be set, for example, within the frequency bandwidth of the driving signals to be supplied from the transmitting unit to the ultrasonic probe or shall be set equivalent to the frequency bandwidth of the driving signals. This can produce equivalent effects to those of applying Doppler demodulation processing at the receiving process by the transducer, and obtain output signals containing Doppler frequency components from which the frequency components of driving signal are removed.

Further, the modulated bias supply unit can be configured in such a way that the phase of the modulated bias voltage signals is displaced by a pre-determined amount for each of the multiple transducers according to the focus position at the time of receiving. This can produce equivalent effects to those of performing phasing processing at the receiving process by the transducer, and align the phases of output signals of multiple transducers.

Further, the ultrasonic diagnostic apparatus according to the third embodiment of the present invention comprises an ultrasonic probe for transmitting and receiving ultrasound to and from a subject, a transmitting unit for supplying driving signals to the ultrasonic probe and a receiving unit for processing signals to be outputted from the ultrasonic probe and obtaining diagnostic information regarding the subject. The ultrasonic probe is equipped with a transducer, wherein a pair of electrodes is positioned with space in-between, at least one electrode of the pair is configured as displaceable, and the pair is connected with an output terminal and a bias terminal for applying bias voltage signals between the pair of electrodes. The receiving unit is equipped with a modulated bias supply unit, which applies bias voltage signals with modulated amplitudes, as bias voltage, to the transducer.

Further, the ultrasonic diagnostic apparatus according to the fourth embodiment of the present invention comprises an ultrasonic probe for transmitting and receiving ultrasound to and from a subject, a transmitting unit for supplying driving signals to the ultrasonic probe and a receiving unit for processing signals to be outputted from the ultrasonic probe and obtaining diagnostic information regarding the subject. The ultrasonic probe has a transducer for receiving ultrasound, and the transducer performs Doppler demodulation processing at the time of receiving. For example, the transducer modulates its receiving sensitivity in time course and performs the aforementioned Doppler demodulation processing in the process of converting ultrasonic signals to electric signals.

Further, the ultrasonic diagnostic apparatus according to the fifth embodiment of the present invention comprises an ultrasonic probe for transmitting and receiving ultrasound to and from a subject, a transmitting unit for supplying driving signals to the ultrasonic probe and a receiving unit for processing signals to be outputted from the ultrasonic probe and calculating diagnostic information regarding the subject. The ultrasonic probe is equipped with multiple transducers for receiving ultrasound, and the multiple transducers perform phasing processing when receiving ultrasound. For example, these multiple transducers modulate their receiving sensitivity at each given phase, and perform the aforementioned phasing processing in the process for converting ultrasonic signals to electric signals.

The ultrasonic diagnostic apparatus according to the fourth and fifth embodiments of the present invention can use a receiving transducer having characteristics, for example, that the receiving sensitivity changes depending on the level of bias electric voltage to be applied. The receiving unit can be configured to have a modulation bias supply unit, which applies bias voltage signals with modulated amplitudes, as bias voltage, to a receiving transducer.

Effect of the Invention

Because the ultrasonic diagnostic apparatus of the present invention can demodulate ultrasonic signals when they are received by the transducer, the ultrasonic diagnostic apparatus with dramatically improved sensitivity than conventional apparatus, which can detect a very weak ultrasonic reflection signal without allowing them to be hidden in thermal noise from an amplifier, can be provided. Further, the relocation of the demodulation process, which has bee performed in the signal processing unit using electronic circuits, to the receiving unit can contribute to a dramatic downsizing of the ultrasonic diagnostic apparatus.

BEST MODE FOR CARRYING OUT THE INVENTION

An embodiment of the ultrasonic diagnostic apparatus of the present invention will be described.

Firstly, the principle of this invention will be explained. This invention is configured with the flow of signals: Probe having signal processing functions to Amplifier to Signal processing unit. This configuration is different from that of the receiving system of the conventional ultrasonic diagnostic apparatuses, wherein the flow is from Probe to Pre-amplifier to Signal processing unit. This will improve the ratio of signals to noise of the receiving system and provide a highly sensitive ultrasonic diagnostic apparatus, wherein the probe performs such signal processing functions as beam forming and Doppler demodulation processing. Consequently, the main processing to be carried out at the signal processing unit following the amplifier is limited to the sampling process such as A/D conversion.

Such configuration can be provided by using an ultrasonic probe equipped with a transducer, the receiving sensitivity of which changes according to the level of bias voltage, and by modulating its bias voltage, the ultrasonic reflection signals received by the probe can be demodulated by the probe's own function. Drawing on the example of the use of the continuous wave Doppler method, when ultrasound of 2 MHz, for example, is irradiated inside the body, the frequency of ultrasonic signals reflected on the moving objects such as blood flow will be shifted depending on the speed of movement, by the Doppler effects, to for example, 2.001 MHz. Accordingly, if the bias voltage to be applied to the probe is modulated at 2 MHz, the output from the probe will be the multiplication of the two figures, that is 0.001 MHz=1 KHz and 4.001 MHz. Of these, the signal of 1 KHz, low-frequency component, can be extracted easily by a subsequent filter, so that the Doppler demodulation processing can be practically performed by the probe. Because the demodulation process by this probe is performed on the step prior to the amplifier, there is no influence of thermal noise from the amplifier and weak signals which might have been hidden in thermal noise from the amplifier with the conventional technology can be extracted with the dramatically improved signal to noise ratio.

However, since the probe which has conventionally used a piezoceramic transducer has a fixed receiving sensitivity, which is determined by its electromechanical coupling coefficient and geometric shape, it is not possible to provide a means to demodulate received signals at such receiving process by probe. The inventors of the present invention focused attention to the ultrasonic transducer which can control the sensitivity of receiving by means of the level of bias voltage. It is because, if the level of bias voltage itself is modulated at the probe having such transducer, it becomes possible that the received signals are demodulated by the probe in the receiving process. For such ultrasonic transducer, electrostrictive materials rather than piezoelectric ceramics can be used. That is because when the transducers is made of electrostrictive material, the electrostrictive effect caused by the applied DC bias voltage provides electromechanical conversion, and the level of the electrostrictive effect can be controlled by the level of DC bias voltage. As a more preferable ultrasonic transducer which can control sensitivity, cMUT (Capacitive Micromachined Ultrasonic Transducer) whose sensitivity is determined by the DC bias voltage can also be used.

Further, the transducers made of electrostrictive materials or cMUT have been used with a given and constant bias voltage applied, but it has been not disclosed that the bias voltage itself is modulated. In fact, Patent Document 1 describes "DC bias voltage" and so on. In the present invention, it is important to provide the probe with demodulating functions for demodulating ultrasonic reflection signals at its receiving process by modulating the level of bias voltage that determines the sensitivity of the probe, and the probe should not be limited to those having a transducer made of the above-mentioned electrostrictive materials or cMUT.

Next, the ultrasonic diagnostic apparatus according to this embodiment will be specifically explained. Firstly, the key of this invention, a structure of an array-type ultrasonic probe 10, whose sensitivity can be controlled depending on the level of bias voltage, will be explained. In this embodiment, the array type probe 10 uses cMUT as an example. FIG. 1 is a schematic structure of the array-type probe 10. The probe 10 has a structure of one-dimensional array, wherein m pieces of strip-form transducers 11-1 to 11-$m$ (m: natural number, for example 64 or 192) are arranged in array, and on the back of the transducers, 11-1 to 11-$m$, a backing layer 12 is provided. Further, on the ultrasound transmitting side (upper side of FIG. 1) of the transducers, 11-1 to 11-$m$, a matching layer 13 is provided and over which an acoustic lens 14 is further provided. The transducers, 11-1 to 11-$m$, convert transmitting wave electric signals to ultrasound and transmit the ultrasound inside the body as well as receive ultrasound reflected inside the body, convert it into electric signals and form reflection signals. The backing layer 12 is provided in order to absorb unnecessary ultrasound to be transmitted to the backsides of the transducers 11-1 to 11-$m$ and to suppress unnecessary vibration of the transducers 11-1 to 11-$m$. The matching layer 13 is provided in order to improve the efficiency of transmitting ultrasound into the body by matching acoustic impedance of the transducers 11-1 to 11-$m$ with that of the body. In FIG. 1, the commonly used structure in which the matching layer 13 is of two-layer structure is shown. The acoustic lens 14 converges ultrasonic beams to the so-called short axis direction, which is orthogonal to the direction of the array of the transducers 11-1 to 11-$m$.

In this embodiment, each of the transducers 11-1 to 11-$m$ comprises multiple small, for example, hexagonal drums 18, as shown in FIG. 2. (In FIG. 2, only 3 elements of transducers 11-3 to 11-5 are shown for convenience of illustration.) Each drum 18 can be assumed electrically as condenser, as explained later by using FIG. 3. However, the group of drums 18, which constitute each of the transducers 11-1 to 11-$m$, does electrically equivalent work to that by many parallel condensers since the upper electrodes 18$a$ are mutually connected by means of wiring 18$g$ and the lower electrode 18$b$ is used as a common electrode.

The structure of a drum 18 is explained by using FIG. 3. The drum 18 is produced with a micro-fabrication technology commonly used in the semiconductor processing, and has a board 18$c$, a semiconductor board such as silicon, a lower electrode 18$b$ which is provided on the board 18$c$, an insulating film 18$d$, which functions as a support part, a semiconductor film 18$f$ provided on the insulating film 18$d$, and an upper electrode 18$a$, which is provided further on the semiconductor film 18$f$. Between the semiconductor film 18$f$ and the lower electrode 18$b$, a vacuum (or at a given gas pressure) hole 18$e$, which is produced by etching the insulating film 18$d$, is provided. The semiconductor film 18$a$ composed of compound semiconductor and so on is shaped as being stretched in a space just like a musical instrument drum, with its edge being supported by the insulating film 18$d$. The application of the DC bias voltage between the upper and lower electrodes 18$a$ and 18$b$ generates a coulomb force, and provides the semiconductor film 18$f$ with moderate tension. When a driving AC signal is applied between the upper and lower electrodes 18$a$ and 18$b$ as superimposed on the DC bias voltage at the time ultrasonic transmission, ultrasound is generated from the drum 18 as the sound is produced by drum rolling. Further, when ultrasound is incident into this drum 18 at the time of ultrasonic transmission, the distance between electrodes 18$a$ and 18$b$ changes depending on the amplitude and the shape of the ultrasound, and the capacitance of condensers composed by these two electrodes 18$a$ and 18$b$ changes accordingly. By detecting the changes in the capacitance from the electric signals at the two electrodes 18$a$ and 18$b$, ultrasound can be received. As shown in FIG. 2, each of the transducers 11-1 to 11-$m$ is configured in such a way that a number of drums 18 are arranged in parallel. Therefore, by generating ultrasonic signals simultaneously at numerous drums 18 and transmitting them into the body, or by receiving the signals simultaneously at numerous drums 18, reflection signals can be produced.

It is known that in the probe 10 of such cMUT structure, the level of ultrasound to be transmitted to the driving AC signal with a certain amplitude (namely, the transmission sensitivity expressing the efficiency of conversion from electric signals to acoustic signals) and the level of electric signal to be obtained for the ultrasound with a certain amplitude (namely, the receiving sensitivity expressing the efficiency of conversion from acoustic signal to electric signal) are proportional to two times the level of the bias voltage, in case the bias voltage is both DC (See right column, page 682 in IEEE Transactions On Ultrasonics, Ferroelectric, And Frequency Control, Vol 45 pp. 678-690). Consequently, if the level of the DC bias voltage at the time of transmission is dc, and the driving signal waveform, which changes over the same period t, is f(t), the level of ultrasonic signal, T(t), to be transmitted from the probe 10 is expressed with the following equation (1). Further, if the DC bias voltage at the time of receiving is dc and the ultrasonic signals to be received is g(t), the output voltage R(t) of the probe 10 is expressed with the following equation (2).

$$T(t)=2 \cdot Kt \cdot dc \cdot f(t) \quad (1)$$

$$R(t)=2 \cdot Kr \cdot dc \cdot g(t) \quad (2)$$

where, Kt and Kr are constants depending on the constituting material and geometric dimension of the transducer.

It is known from the equations (1) and (2) that at the time of transmission the ultrasonic signal T(t), which is proportional to the level of DC bias voltage and similar to the transmission signals f(t), can be transmitted, and that at the time of receiving the voltage signal R(t), which is proportional to the level of DC bias voltage and similar to the receiving ultrasonic signal g(t), can be outputted.

The inventors of the present invention experimentally confirmed that the relationship shown in the equation (2) remains even if the level of bias voltage is changed over the time t. That is, when it is assumed that the level of bias voltage is a function of time F(t), the voltage signal R(t) attributable to the received ultrasonic signal can be expressed with the following equation (3). Thus, by applying F(t) in which the level of bias voltage itself is modulated, the voltage signal R(t) in the receiving process of the probe 10 can be modulated by F(t), and therefore the received signals can be demodulated by the probe 10 in the process of receiving them.

$$R(t)=2 \cdot Kr \cdot F(t) \cdot g(t) \quad (3)$$

Next, a circuit configuration for achieving transmitting and receiving actions by applying bias voltage at the time of transmitting and receiving transducers 11-1 to 11-m at the probe 10 will be described by using FIG. 4. In FIG. 4, major elements of the drum 18 of FIG. 3, such as upper electrode 18a, lower electrode 18b and semiconductor film 18f, are schematically illustrated. In transmission, the adder 103 and the resistance 102 are used to superimpose the DC bias voltage from the bias voltage generating source 104 and the driving signal waveforms from the driving signal generating source 105 by the adder 103, and to apply them to the upper electrode 18a via the resistance 102.

On the other hand, at the time of receiving, the resistance 102 and the capacity detector (for example the amplification unit 31) are used to apply the modulated bias voltage waveform in an equivalent bandwidth of the driving signal from the bias voltage generating source 104 to the upper electrode 18 via the resistance 102, and the capacity between the upper and lower electrodes, 18a and 18b, is detected by the amplification unit 31. When the reflection ultrasonic signal is incident into the drum 18, the capacitance of the upper electrode 18a and the lower electrode 18b is modulated according to the level and waveform of incident ultrasound and at the same time by the modulation bias. Consequently, by detecting the capacitance by the amplification system 31 having transparent impedance 111, the receipt and demodulation of ultrasonic signals can be performed simultaneously. Further, the condenser 101 is inserted between the upper electrode 18a and the impedance 111 of the amplification unit 31 to prevent the bias voltage to be applied to the upper electrode 18a becoming excessive to the amplification unit 31. Further, the lower electrode 18b can be set at the ground voltage level.

Therefore, one transducer of the array type probes 10 can be provided a 3- or 4-terminal element configuration, as specifically shown in FIGS. 5 (a), (b) and (c). That is, when the array type probe 10 is divided into transmitting and receiving probes, the transducer 10a constituting the transmitting probe is a 3-terminal device having a bias voltage input terminal B, a transmitting terminal T for inputting driving signals and a ground terminal G, as shown in FIG. 5 (a). The transmitting transducer 10a contains the adder 103 and the resistance 102a, both of which are connected with the upper electrode 18a of the transducer 11-L (L=any of 1–m), and is configured in such a way that the adder 103 applies superimposed driving signal and bias voltage to the upper electrode 18a via the resistance 102a. The lower electrode 18b is connected with the ground terminal G. On the other hand, the transducer 10b which constitutes the receiving probe is a 3-terminal device, having a bias voltage input terminal B, a receiving terminal R for outputting converted voltage signals and a ground terminal G. The receiving transducer 10b contains resistance 102b and condenser 101, which are connected with the transducer 11-M (M=any of 1–m), and applies modulated bias voltage to the upper electrode 18a via the resistance 102b. And, the voltage of the upper electrode 18a is outputted via the condenser 101 from the receiving terminal R. The lower electrode 18b is connected with the ground terminal G.

In case that the array type probe 10 is used for both transmitting and receiving purposes, the transducer 10c is a 4-terminal device, having a bias voltage input terminal B, transmitting terminal T, receiving terminal R and ground terminal G, as shown in FIG. 5(C). Each transducer 10c is configured as containing the adder 103, which superimposes bias voltage and driving signals to be applied to the transducer 11-N (N is one of 1––m), the resistance 102 and the condenser 101.

Next, the entire configuration and the action of the ultrasonic diagnostic apparatus 1 which utilizes the aforementioned array type probe 10 of the present invention will be described using FIG. 6. The ultrasonic diagnostic apparatus 1 according to this embodiment is an apparatus for obtaining diagnostic information (for example, blood flow rate) regarding a subject by using the continuous wave Doppler method.

As shown in FIG. 6, the ultrasonic diagnostic apparatus 1 comprises the array type probe 10, the continuous wave transmitting unit 20, the phase rotation unit for transmitting 21, the DC bias supply unit 23, the receiving unit 60, the phase rotation unit for receiving 22, the modulated bias amplification unit 24, the system control unit 300 and the display unit 90. The receiving unit 60 is equipped with the amplification unit 31, the low pass filter unit 41, the adder unit 51 and the diagnostic information calculation unit 80.

In this embodiment, the array type probe 10 has N units of transducers, which are divided into multiple units (N/2) of transmitting transducers 10a and multiple units (N/2) of receiving transducers 10b and arranged in array. The explanation is provided separately for each arrangement. For example, it is similar to the case in which the array type transducers on the right half (1–N/2) of the sector array type probe are used for the transmitting probe 10A, while the left half (N/2+1–N) are used for the receiving probe 10B. The structures of the transmitting transducer 10a and receiving transducer 10b have been as already explained. Further, FIG. 6 shows the transmitting transducer 10a and the receiving transducer 10b by one transmitting transducer and one receiving transducer for convenience of illustration.

The continuous wave transmitting unit 20 generates continuous sine waves (frequency is $\omega_0$, for example, 2 MHz). The phase rotation unit for transmitting 21 rotates a given amount of phase of the continuous sine wave of the continuous wave transmission unit 20 at every transmitting transducer 10a, for the purpose of focusing at the time of transmission, and supplies them as a driving signal to the transmission terminal T of the transmitting array type transducer 10a. On the other hand, the DC bias supply unit 23 supplies a given level of DC bias to the bias terminal B of the transmitting transducer 10*a* for the purpose to regulate the sensitivity of the transmitting transducer 10*a*. By this, the continuous wave ultrasound is radiated from the transmitting transducers 10*a* arranged in array to the given focus position inside the body.

As it is known well, the ultrasound reflected on the moving object such as blood flow shifts its frequency according to the speed of movement of the moving object to $\omega_1 (=\omega_0 t + \Delta\omega_0$, for example, 2 MHz+1 KHx) and then enters receiving transducers 10*b* arranged in array. The incident ultrasonic signals are converted into electric signals at the receiving transducer 10*b*, and in this embodiment they undergo the demodulation processing simultaneously with the conversion to the electric signals, as mentioned above.

The phase rotation unit for receiving 22 rotates a given amount of phase of the continuous sine wave signals to be outputted by the continuous wave transmission unit 20 at every receiving transducer 10*b* for the purpose of focusing at the time of receiving, and supplies them to the modulated bias amplification unit 24. The modulated bias amplification unit 24 amplifies the amplitude of the continuous sine wave signals with a rotated phase to the pre-determined amplitude (for example 100V) and thereby generates continuous wave voltage signals having a given amplitude and the same frequency with that of the driving signal, and supplies them as a modulated bias signal to the bias terminal B of the receiving transducer 10*b*.

Of receiving transducers 10*b* arranged in array, the receiving process of the $k^{th}$ transducer 10*b* will be explained specifically by using equations. Ultrasound reflected inside the body and received by the $k^{th}$ transducer can be expressed as follows by using phase θ(k), which is determined by the distance between the focus position inside the body and the $k^{th}$ transducer 10*b*.

$$g(t,k) = G \cdot \cos(\omega_1 t + \theta(k)) \quad (4)$$

By rotating the phase by θ(k) at the phase rotation unit for receiving 22, the modulated bias signals to be supplied to the bias terminal B of the $k^{th}$ receiving transducer 10*b* will be expressed as follows:

$$F(t,k) = F \cdot \cos(\omega_0 t - \theta(k)) \quad (5)$$

In this case, the voltage signal R(t) to be outputted from the receiving terminal R of the $k^{th}$ receiving transducer 10*b* is proportional to F(t, k)·g(t,k) according to the aforementioned equation (3) and, if its harmonic component (for example, 4.001 MHz) is excluded it can be expressed as follows:

$$R(t,k) = 2 \cdot Kr \cdot F \cdot G \cdot \cos(\Delta\omega_0 t) \quad (6)$$

Thus, only the frequency of $\Delta\omega_0$ (for example 1 KHz) is extracted and the Doppler demodulation is achieved. Furthermore, the absence of θ(k) term and equivalent phase independent from the component number k indicate that the phasing processing of the electronic focus was performed simultaneously.

That is, the output waveform of the receiving terminal R of the receiving transducer 10*b* according to the present embodiment is equivalent to that of the signals which have undergone Doppler demodulation and phasing. Therefore, it becomes possible to obtain Doppler frequency $\Delta\omega_0$ (1 KHz) at the receiving unit 60, only by removing harmonic components (4.001 MHz) to be generated when receiving at the transducer 10*b* by the low pass filter unit 41. Further, the amplification unit 31, as a step prior to the low pass filter unit 41, performs amplification to a given level necessary for the signal processing. The addition unit 51, as a step subsequent to the low pass filter unit 41, adds signals from each receiving transducers arranged in array. However, since the output signals from each receiving transducer is independent from the number k as shown in the equation (6), the addition unit 51 needs not to perform any conventional phasing processing and does simple addition only. Accordingly, the outputs from the addition unit 51 are Doppler frequency, audio frequency bandwidth of 1 KHz in this case, which is then inputted into the diagnostic information calculation unit 80. The diagnostic information calculation unit 80 performs calculation for generating diagnostic information of the subject (for example, the moving speed of the moving object and its 2-dimensional distribution images) by known calculations such as auto correlation processing. The diagnostic information is displayed in the display unit 90. The exchange of the sequence between the low pass filter unit 41 and the amplification unit 31 does not impair the function of the present invention, as long as the harmonic component does not saturate the amplification unit 31 or the addition unit 51.

The system control unit 300 outputs a control order to the continuous wave transmitting unit 20, the phase rotation unit for transmitting 21, the phase rotation unit for receiving 22, the DC bias supply unit 23, the modulation bias amplification unit 24 and others. The system control unit 300 comprises, for example, DSP (Digital Signal Processor). Specifically, the system control unit 300 has functions to calculate and supply data necessary for calculating phase rotation and diagnostic information and to control bias voltage. In order to avoid complications in drawings, a diagram showing the flow of order from the system control unit 300 is omitted in FIG. 6. The display unit 90 displays diagnostic information about the subject which the receiving unit 60 obtains from the Doppler frequency.

The inventors of the present invention have fabricated the ultrasonic diagnostic apparatus 1 using a probe 10, the sensitivity of which depends on the aforementioned bias voltage, and confirmed its performance. One transducer composing the present probe 10 is configured in such a way that the drums 18 are arranged in 4 horizontal and 200 vertical rows as shown in FIG. 2, where the height of the hole 18*e* in the drum 18 and the diameter of the drum 18 are 0.3 micron and 50 μm, respectively. The probe 10 is structured in such a way that the transducers 11-1 to 11-*m* are arranged, as shown in FIG. 1. The level of DC bias voltage to be applied to the transmitting array type transducers was 100 v, and the amplitude of modulation bias voltage to be added to the receiving transducer was 100 v (peak to peak). With this structure and under these conditions, favorable Doppler demodulation sensitivity was obtained at the ultrasonic frequency in the range of 2 to 5 MHz.

Next, as a comparative example, the configuration of the ultrasonic diagnostic apparatus which provides conventional continuous wave Doppler functions is described by using FIG. 8. In the ultrasonic diagnostic apparatus of FIG. 8, the probe 170 having N units of array type transducers is divided into transmitting probe 170A and receiving probe 170B each comprising N/2 units of transducers. The probes 170A and 170B are composed of common piezoelectric type transducers. In the signal processing unit a demodulation unit 140 having both phasing and Doppler demodulation functions is provided. In the apparatus in Comparative Example of FIG. 8, output signals from the phase rotation unit for receiving 22 are inputted in the demodulation unit 140. The units which are equivalent to those of the ultrasonic diagnostic apparatus according to this embodiment are given the same mark and their explanation is omitted. Continuous wave ultrasound transmitted into the body from the transmitting probe 170A is reflected on the moving objects such as blood flow inside the body, and enters the receiving probe 170B as the ultrasound with the frequency of $\omega_1(=\omega_0 t+\Delta\omega_0$, for example 2 MHz+1 KHz). As the receiving probe 170B has no demodulation function, unlike the probe according to this embodiment, its output voltage waveform has the frequency of $\omega_1$. The demodulation unit 140 multiplies the frequency component $\omega_2$ of the received signals by the output $\omega_0$ from the receiving phase rotation unit 22, to yield $\Delta\omega_0$ and $2\omega_0 t+\Delta\omega_0$. At the same time, it performs the phasing of $\theta(k)$ contained in the received signals. The low pass filter 41 extracts from $\Delta\omega_0$ and $2\omega_0 t+\Delta\omega_0$ only $\Delta\omega_0$ element (1 KHz for example), namely the Doppler frequency. The system control unit 1300 controls such processing.

In the configuration of the comparative example in FIG. 8, because the pre-amplification unit 131 amplifies the received signals by the ultrasonic probe 170b to the level processable by the demodulation unit 140, the performance of the demodulation unit 140 is practically limited by the performance of the pre-amplification unit 131 producing high thermal noises. As a result, in the ultrasonic diagnostic apparatus according to the comparative example of FIG. 8, thermal noise (status of blood flow, etc.) inside the body, which is used as diagnostic information, was sometimes hidden in the noise produced by the pre-amplification unit 131.

In contrast, since in the ultrasonic diagnostic apparatus 1 of the present invention, the ultrasonic probe 10, whose sensitivity is determined by the bias voltage, can demodulate signals when receiving them, by modulating bias voltage, the demodulation processing is not affected by the thermal noise of the amplification unit 31. Consequently, very weak signals which might be hidden in thermal noise if they are demodulated at the later stage of the amplification unit 31 can be detected with a dramatically improved signal to noise ratio. Further, since the demodulation processing is performed at the probe 10, the receiving unit 60 which performs signal processing requires no demodulation unit 140 which have been used in the conventional electric circuits, and thereby leading to significant down-sizing and lower price of the apparatus.

Further, formerly, there occurred a saturation phenomenon at the pre-amplification unit 131 due to crosstalk between adjacent probes arranged in array. However, since no such saturation phenomenon occurred at the amplification unit in the ultrasonic diagnostic apparatus of the present invention, there is no need to arrange so called gap elements between transmitting probe 10A and receiving probe 10B arranged in array. Accordingly, all elements of the array type probe can be used for Doppler detection, and moreover a Doppler diagnostic apparatus of so called interleaved type where transmitting transducers and receiving transducers are arranged alternately can be fabricated. It also enables the use of better beams as compared with the case where transmitting probes and receiving probes are arranged separately into right and left sections. Further, if the transmitting probe 10A and the receiving probe 10B are configured as the array type transducer 10c, which can be used for either transmitting or receiving purpose, as shown in FIG. 5 (c), they can be used not only for the continuous wave Doppler, but also for the B mode photography, M mode photography, pulsed Doppler and Doppler Computed Tomography (CFM: Color Flow Mapping). The mode known as continuous wave Doppler has been explained so far, but the essence of the present invention remains intact even the probe is used in other modes of ultrasonic diagnostic apparatus, B mode photography, M mode photography, pulsed Doppler and Doppler Computed Tomography (CFM). In fact, in the B mode photography, pulse waveform with a central frequency of 3 MHz, for example, is used for transmitting and receiving ultrasound, and the received pulse with a central frequency of 3 MHz will become an envelope signal after its carrier frequency of 3 MHz is demodulated by the bias voltage modulated at 3 MHz. As known well, the B mode photography displays images by extracting envelope signals using the detection circuit, etc., and converting its strength information to brightness information, wherein, the envelope signals are extracted at the probe's receiving process, and weak signals can be visualized without being hidden in the noise of the subsequent amplifier.

Next, the ultrasonic transmission and receiving actions of the aforementioned ultrasonic diagnostic apparatus 1 of FIG. 6 will be supplementarily described by using FIGS. 7 (a) and (b). FIG. 7 (a) is a diagram showing a flow of ultrasonic transmitting processing, while FIG. 7 (b) is a diagram showing a flow of ultrasonic receiving processing.

Firstly, the transmitting processing is explained by using FIG. 7 (a).

<Application of DC Bias (S700)>

The operator places the ultrasonic probe 10 in contact with the body surface of the subject. Under the control by the system control unit 300, a given level of DC bias dc is supplied to each transducer of the transmitting probe 10A by the DC bias supply unit 23.

<Generation of Driving Signals (S702)>

Under the control by the system control unit 300, driving signals f(t) are supplied by the continuous wave transmitting unit 20 to the transmitting phase rotation unit 21. The driving signal f(t) is a continuous sine wave (for example, frequency $\omega$ is 2 MHz), and expressed by the equation (7), where $F_0$ is a constant.

$$f(t)=F_0 \cdot \cos(\omega_0 t) \quad (7)$$

<Phase Rotation of Driving Signals (S704)>

Under the control by the system control unit 300, the phase rotation unit for transmitting 21 rotates the phase of driving signal f(t) by a given amount $\theta'$ and delivers it to each transducer of the transmitting probe 10A. The amount of rotated phase $\theta'$ has been pre-determined for each transducer in accordance with a focus position for achieving focusing at transmission. Specifically, the driving signal f(t,k) to be supplied to the $k^{th}$ (k=natural number) from the reference transducer in the array type probe 10A is rotated by the phase of $\theta(k)$. The driving signal f(t,k) is supplied to the transmitting transducer as superimposed on the DC bias dc. The driving signal f(t,k) to be supplied to the transmitting probe 10a can be expressed by the equation (8) as follows:

$$f(t,k)=F_0 \cdot \cos(\omega_0 t-\theta'(k)) \quad (8)$$

<Injection of Ultrasonic Transmission Signals (S706)>

The transmitting probe 10A injects ultrasonic transmission signals T(t,k) corresponding to the driving signal f(t,k) to the subject (for example, moving objects such as blood cells). Specifically, the ultrasonic transmission signal T(t,k) to be injected to the object is expressed by the equation (9), where Kt is a constant to be determined based on the material and geometric dimension of the transmitting transducer.

$$T(t,k)=(2 \cdot Kt \cdot dc \cdot f(t,k))+(\text{Harmonic component}) \quad (9)$$

The ultrasonic signal T(t,k) is reflected on the subject and received by the receiving probe 10B (S806). Action of each unit at the time of receiving will be explained by using FIG. 7(b).

<Supply of Driving Signals (S800)>

Under the control by the system control unit 300, the driving signals f(t) generated by the continuous wave transmitting unit 20 are supplied to the receiving phase rotation unit 22.

Based on these signals f(t), modulated bias signals having the same frequency $\omega_0$ with that of the driving signals are generated. In the following texts, the driving signal f(t) is named as the modulation signal f(t).

<Phase Rotation of Modulated Bias Signals (S802)>

The phase rotation unit for receiving 22 rotates the phase of the modulated signal f(t) by a given amount θ in order to achieve focusing in receiving. The amount θ of phase to be rotated has been pre-determined according to the focus position in receiving. The modulated signal f(t,k) to be supplied to the $k^{th}$ (k is a natural number) transducer from the reference transducer of the receiving probe 10B is rotated by the phase of θ(k). The modulated signal f'(t,k) whose phase has been rotated is expressed by the equation (10) as follows. The modulated signal f'(t,k) is supplied to the modulated bias amplification unit 24.

$$f'(t,k)=Fo\cdot\cos(\omega_0 t-\theta(k)) \quad (10)$$

<Application of Modulated Bias Signals (S804)>

The modulated bias amplification unit 24 generates modulated bias signals F(t,k) whose frequency $\omega_0$ is the same with that of the driving signals, by amplifying the modulated signals f'(t,k), and supplies them to the receiving probe 10B. For example, in case that the amplitude of the modulated signal f'(t,k) is 10V, the amplitude of the modulated bias signal F(t,k) is amplified to approximately 100V. The modulated bias signal F(t,k) following the amplification is expressed by the equation (11), where F is a constant, however. Further, the modulated bias signal F(t,k) is given the frequency $\omega_0$, which is the same with that of the driving signal f(t), as shown in the equation (11), but when the frequency of the driving signal has a bandwidth, it is possible to provide the modulated bias signal having such frequency as far as it is within the bandwidth.

$$F(t,k)=F\cdot\cos(\omega_0 t-\theta(k)) \quad (11)$$

The modulated bias signal F(t,k) is applied, via the receiving circuit 13, to the upper electrode 18a of the cMut 18 which composes the probe 10B.

<Receiving and Demodulating of Ultrasonic Reflection Signals (S806)>

The ultrasonic wave transmitted signals transmitted at the aforementioned process S706 are reflected on the subject and reach each receiving transducer as an ultrasonic reflection signal g(t,k). The frequency $\omega_1$ of the ultrasonic reflection signal g(t,k) contains the Doppler shift frequency $\Delta\omega_0$ according to the moving speed of the reflection source such as subject's blood cells ($\omega_1=\omega_0+\Delta\omega_0$), is expressed by the equation (12).

$$g(t,k)=G\cdot\cos(\omega_1 t+\theta(k)) \quad (12)$$

The ultrasonic reflection signal g(t,k) is received by the receiving probe 10B, whose sensitivity is modulated by the modulated bias signal F(t,k). By this, the demodulation signal R(t,k) to be outputted from the receiving probe 10B becomes the signal which undergoes Doppler demodulation processing as in the equation (13). Further, as known from the equation (13), the Doppler shift component has the same phase irrespective of No. k and has undergone phasing processing (beam forming).

$$R(t,k)=(Kr\cdot F\cdot G\cdot\cos(\Delta\omega_0 t))+(\text{Harmonic component}) \quad (13)$$

<Processing of Demodulation Signals>

The demodulated signal R(t,k) to be outputted from the receiving probe 10B is delivered to the receiving unit 60, and after amplification at the amplification unit 31, is deprived of harmonic components at the low pass filter unit 28. By this, the Doppler frequency components can be extracted. Of the signals extracted as a Doppler shift frequency components those for the receiving transducer with corresponding receiving diameter are added by the addition unit 51. The signal outputted from the addition unit 51 undergoes auto correlation processing, etc., at the diagnostic information calculation unit 80, to obtain diagnostic information of the subject, such as blood flow rate and 2-dimensional rate distribution image. The diagnostic information thus obtained is displayed on the display unit 90.

Next, the aforementioned equation (3) will be supplementarily explained. Equation (3) shows that the output voltage of the probe at the time of receiving is proportional to the modulated bias. The equation (2) which shows that the output voltage at the time of receiving by cMUT is proportional to the DC bias is widely known. The inventors have experimentally confirmed that this is applicable to the case where the bias is modulated, obtained the equation (3) and used it in the explanation of the present embodiment. However, for the present invention in which demodulation is performed simultaneously with receiving by the receiving probe, any ultrasonic probe whose receiving sensitivity changes according to the level of bias voltage can be used even if their characteristics do no satisfy the equation (3). Therefore, the present invention can be achieved by using an ultrasonic probe characterized by having second or higher order terms for the ultrasonic reflection signals and modulation bias signals.

Further, the validity of the equation (3) has been experimentally confirmed by the inventors of the present invention, and can be mathematically described as follows. The output voltage signal R(t) at the time of receiving by the cMUT probe can be expressed with a known squares model as shown in the equation (14).

$$R(t) = Kr\cdot(\text{dc}+g(t))^2 \quad (14)$$
$$= Kr\cdot(\text{dc}^2 + 2\text{dc}\cdot g(t)+g(t)^2)$$

where Kr is a constant, dc is a DC bias voltage and g(t) is an ultrasonic reflection signal.

When the bias voltage is modulated at F(t) in the equation (14), the output voltage signal can be expressed by the equation (15).

$$R(t)=Kr\cdot(F(t)^2+2F(t)\cdot g(t)+g(t)^2) \quad (15)$$

As shown in the equation (15), the output signal R(t) contains both first and second order terms of the ultrasonic reflection signals g(t). Since the ultrasonic transmitted signals are specified as weak signals in order to avoid damaging to the living body, the ultrasonic reflection signals g(t) are also weak (for example, 1V). Therefore, by specifying a larger amplitude of the modulated bias signal F(t) than that of the ultrasonic reflection signal g(t) (approximately 1V), at 100V, for example, the second order term of g(t) can be ignored. Further, as the second order term of F(t) is a harmonic component of the frequency, which is two times higher than that of $\omega_0$, it can be removed easily by the low pass filter unit 41. Accordingly, it can be expressed as in the equation (3).

$$R(t)=2\cdot Kr\cdot F(t)\cdot g(t) \quad (3)$$

This can be expressed with the frequency $\omega_0$ and the Doppler frequency $\Delta\omega_0$ as follows. If the modulation signal is expressed as $F(t)=F\cdot\cos(\omega_0 t)$ and the ultrasonic received signal which undergoes frequency shift by the Doppler effect as $g(t)=G\cdot\cos(\omega_1 t+\theta)$ (where, $\omega_1=\omega_0 t+\Delta\omega_0$, θ: phase rotation amount determined by the distance between reflection object and receiving transducer), the equation (15) can be expressed by the equation (16) as follows.

$$R(t) = Kr \cdot (F^2 \cdot \cos^2(\omega_0 t) + FG(\cos(\Delta\omega_0 t + \theta) + \cos(2\omega_0 t + \Delta\omega_0 t + \theta)) + G^2 \cdot \cos^2(\omega_1 t + \theta)) \quad (16)$$

Also, when the second harmonic components frequency, which is two times higher than that of $\omega_0$, is removed from the DC component by filtering in the equation (16), the equation (17) is provided, and only the Doppler shift component can be extracted as an output voltage R(t) of the probe.

$$R(t) = Kr \cdot F \cdot G \cdot \cos(\Delta\omega_0 t) \quad (17)$$

Accordingly, in this embodiment, if the output of the receiving probe 10b is expressed by the equation (15), it is preferable to specify a larger amplitude of the modulated bias signal F(t), for example, 2 or more larger than that of the ultrasonic reflection signal g(t). It is more preferable to specify 10 times or larger amplitude.

However, since the output characteristics of the cMUT probe changes depending on the materials, shapes and arrangement of the drums and their use conditions, it is obviously possible to use it by controlling output characteristics by designing and specifying the properties of the drum and within the range in which the receiving sensitivity may vary according to the level of bias voltage.

Further, as far as the receiving sensitivity changes according to the level of bias voltage, not only cMUT probe but any other receiving probe in a different configuration can be used. For example, the probe made of electrostrictive material (for example, Pb$(Mg_{1/3}Nb_{2/3})O_3$—$PbTiO_3$ system solid solution ceramics) can be also used.

In the present embodiment, an example in which transmitting and receiving probes are separately installed has been explained. However, there may be an embodiment in which the transducers having both transmitting and receiving functions 10c of a structure shown in FIG. 5 (c) are arranged to transmit and receive ultrasonic signals by the same transducer. Further, although the number of the transmitting transducers (N/2) is equivalent to that of the receiving transducers (N/2) in this present embodiment, it may not necessarily be the equivalent.

The explanation of this embodiment uses the hexagonal shape of the drum 18 for the transducers 11-1 to 11-m, which comprise the probe 10, though the drum can have other shape such as polygonal or circular.

Although the aforementioned ultrasonic diagnostic apparatus is an apparatus employing the continuous wave Doppler method, it can also employ the pulsed Doppler method or the tissue tomography. In the latter case, the image processing unit which generates ultrasonic images (for example, color-Doppler tomographic images or grayscale tissue tomography) based on the received signals is located at the step subsequent to the diagnostic information calculation unit 32 or the addition unit 30.

INDUSTRIAL APPLICABILITY

The present invention can be applied to the ultrasonic diagnostic apparatus, which obtains diagnostic information on a subject (such as moving speed of reflection sources such as blood cells, the speed distribution or tissue tomographic images) by transmitting and receiving ultrasound to and from a subject via the ultrasonic probe, and based on the signals to be outputted from the ultrasonic probe, and particularly provides a highly sensitive ultrasonic diagnostic apparatus with the high signal to noise ratio in the receiving system.

DESCRIPTION OF NOTATIONS

Figure 1:
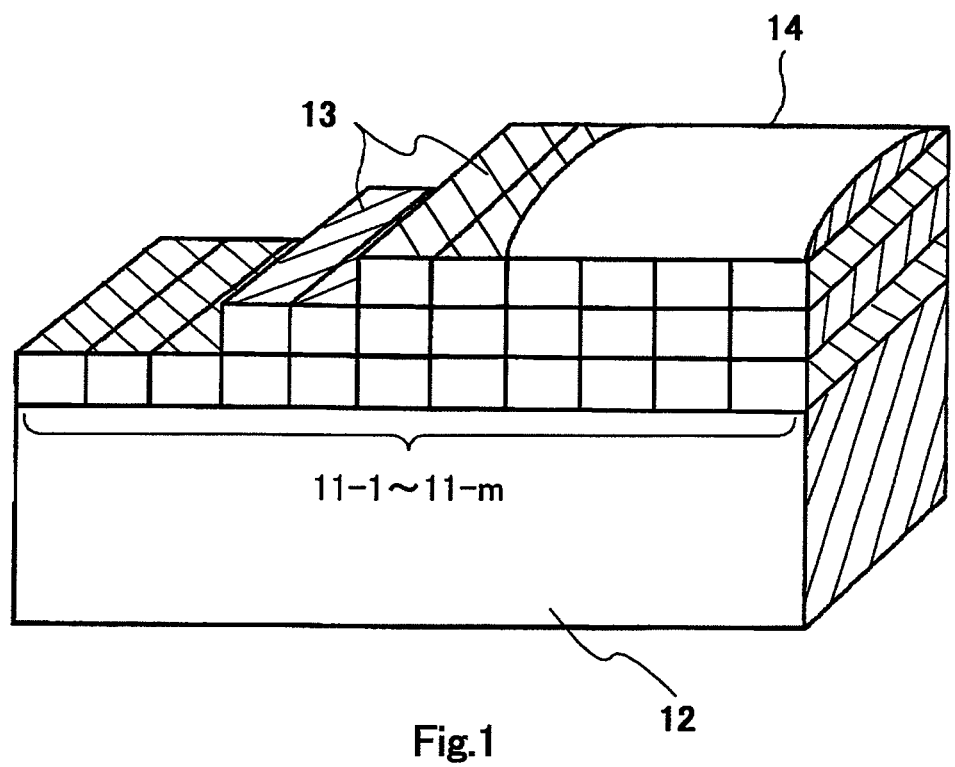
FIG. 1 A cut away perspective view showing a part of the ultrasonic probe 10 according to an embodiment of the present invention FIG. 2 A top view showing transducers 11-1 to 11-m of the ultrasonic probe shown in FIG. 1
Figure 2:
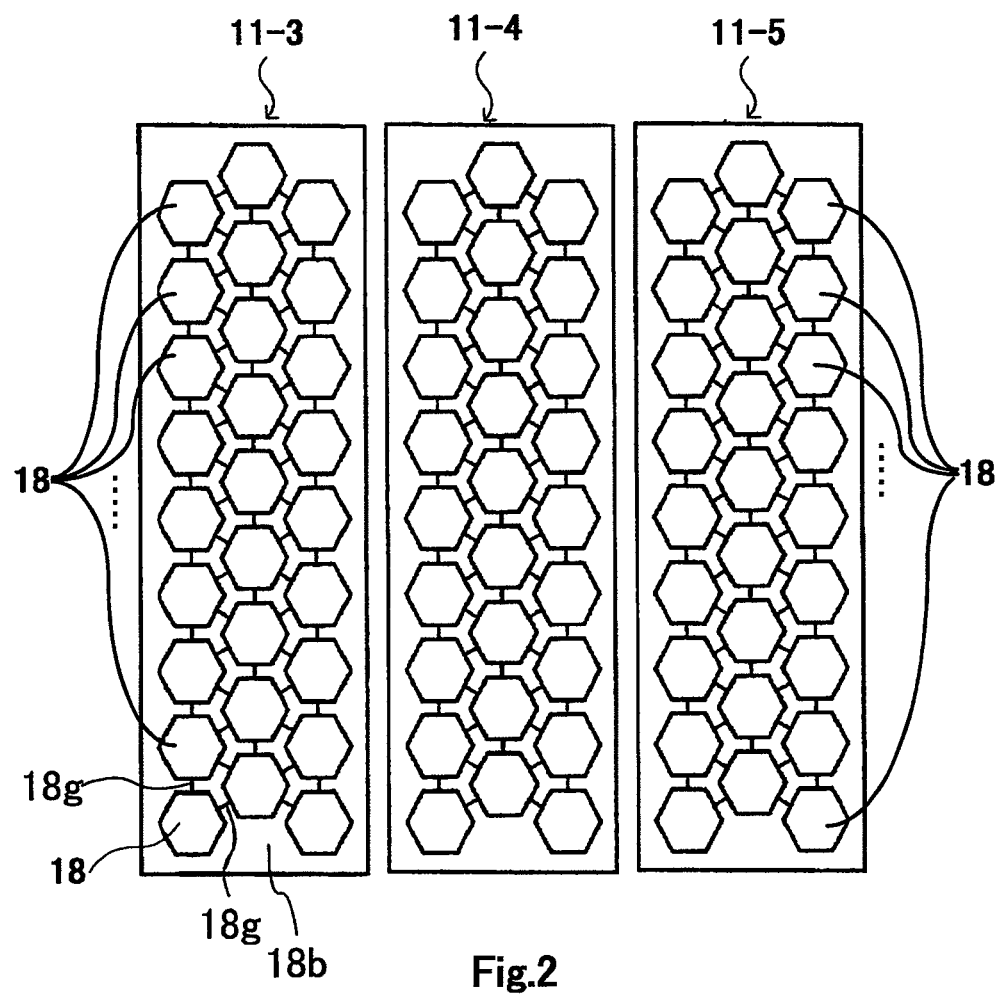
Figure 3:
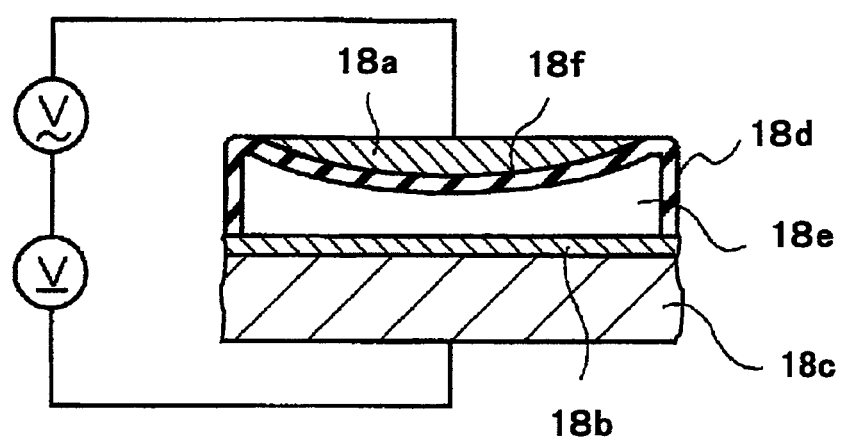
FIG. 3 A sectional view showing the drum 18 comprising the transducers 11-1 to 11-m shown in FIG. 1
Figure 4:
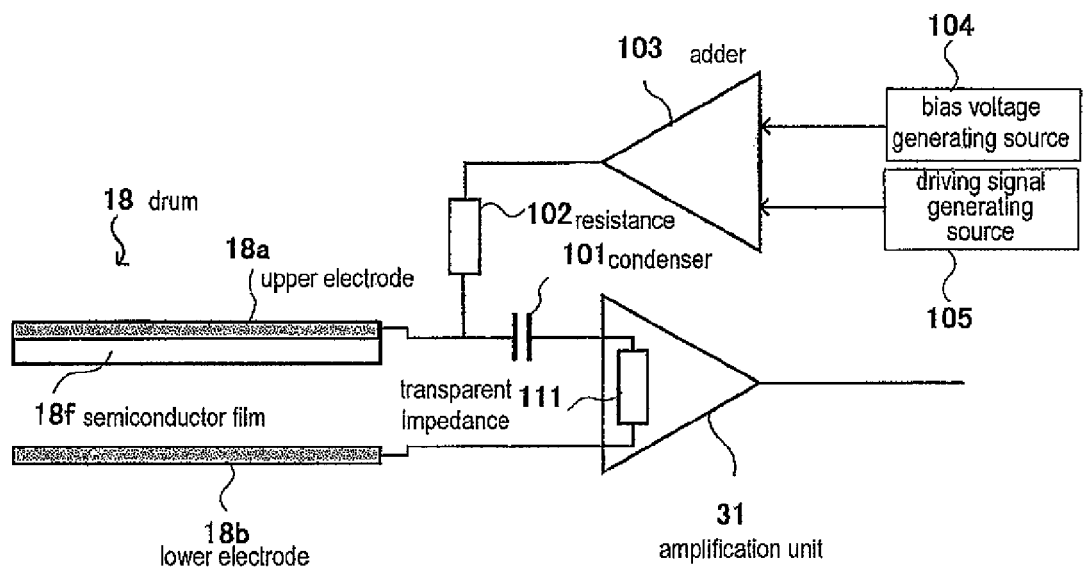
FIG. 4 A circuit diagram showing an electric circuit required for transmitting and receiving ultrasound to and from the drum shown in FIG. 3
Figure 5:
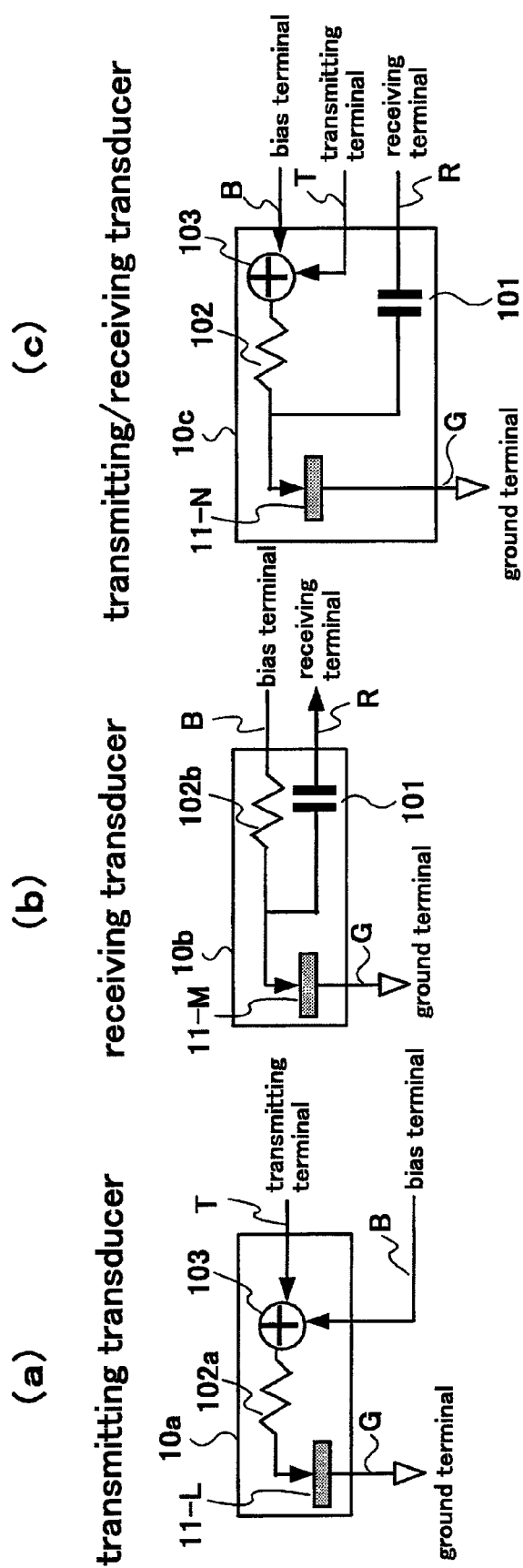
FIG. 5
(a) A block diagram showing a configuration of transmitting transducer
(b) A block diagram showing a configuration of receiving probe
(c) A block diagram showing a configuration of transmitting/receiving transducer FIG. 6 A block diagram showing a configuration of an example of ultrasonic diagnostic apparatus FIG. 7
(a) A diagram showing ultrasonic wave transmitting processing by the ultrasonic diagnostic apparatus of FIG. 6
(b) A diagram showing a flow of ultrasonic wave reception processing by the ultrasonic diagnostic apparatus of FIG. 6
Figure 6:
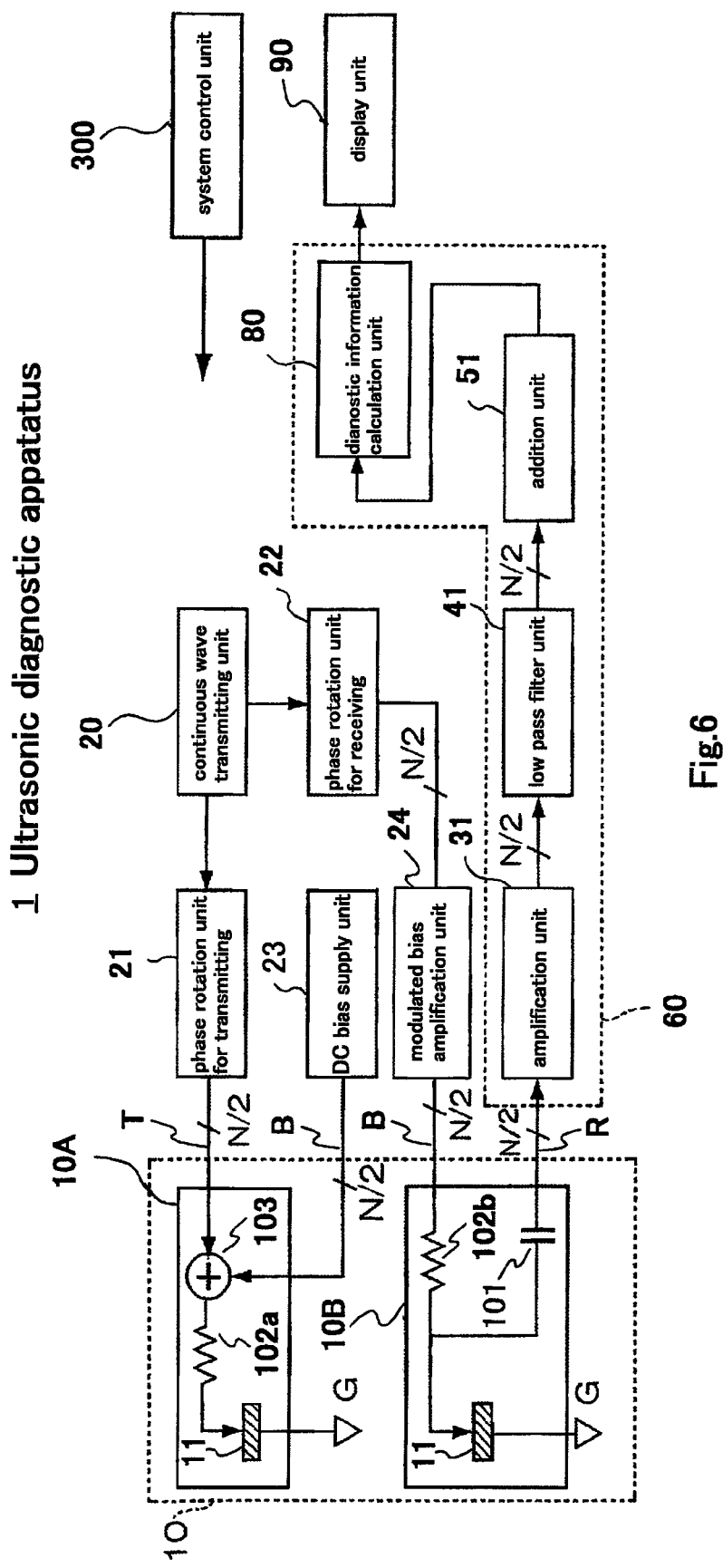
Figure 7:
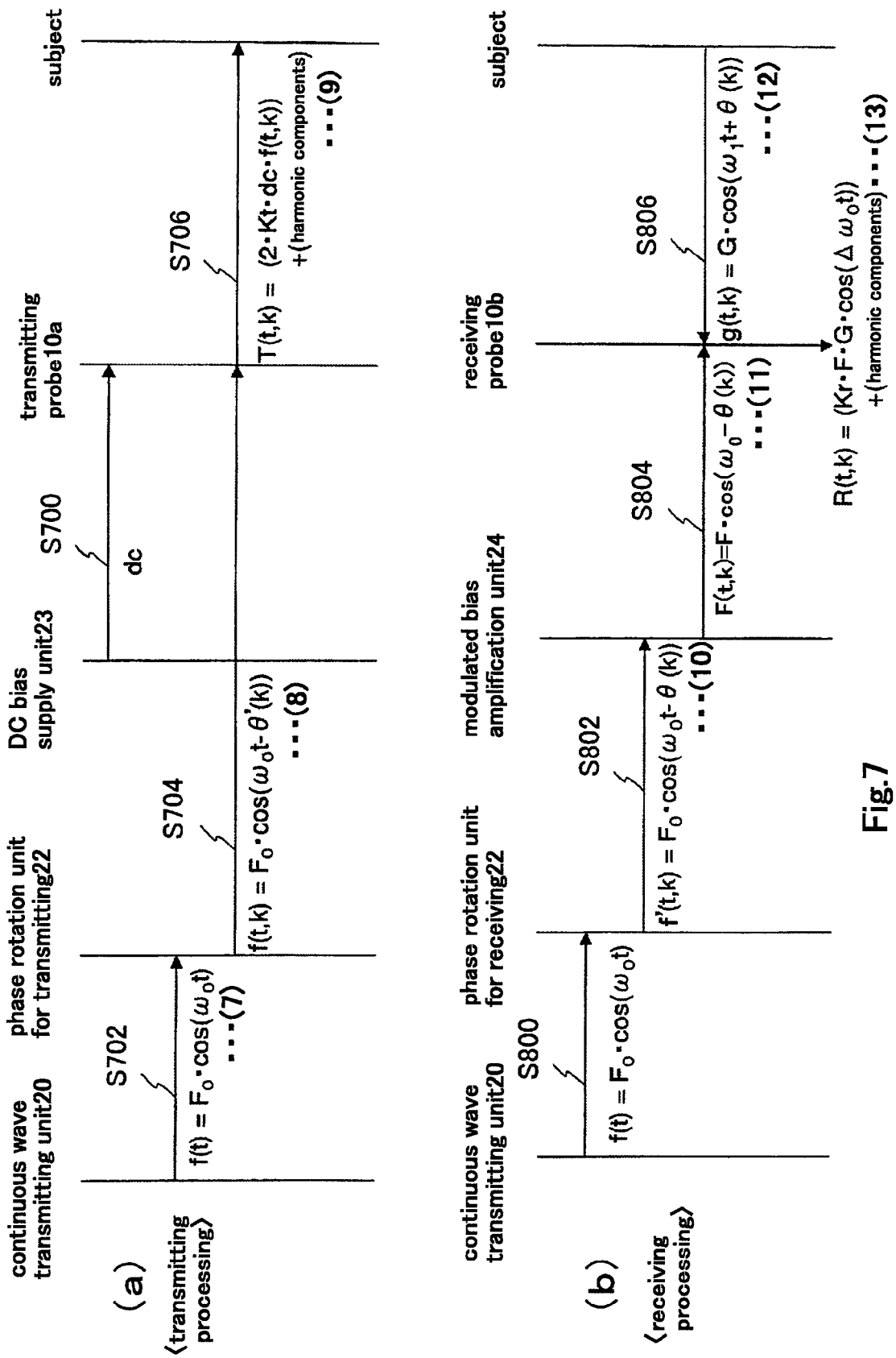
Figure 8:
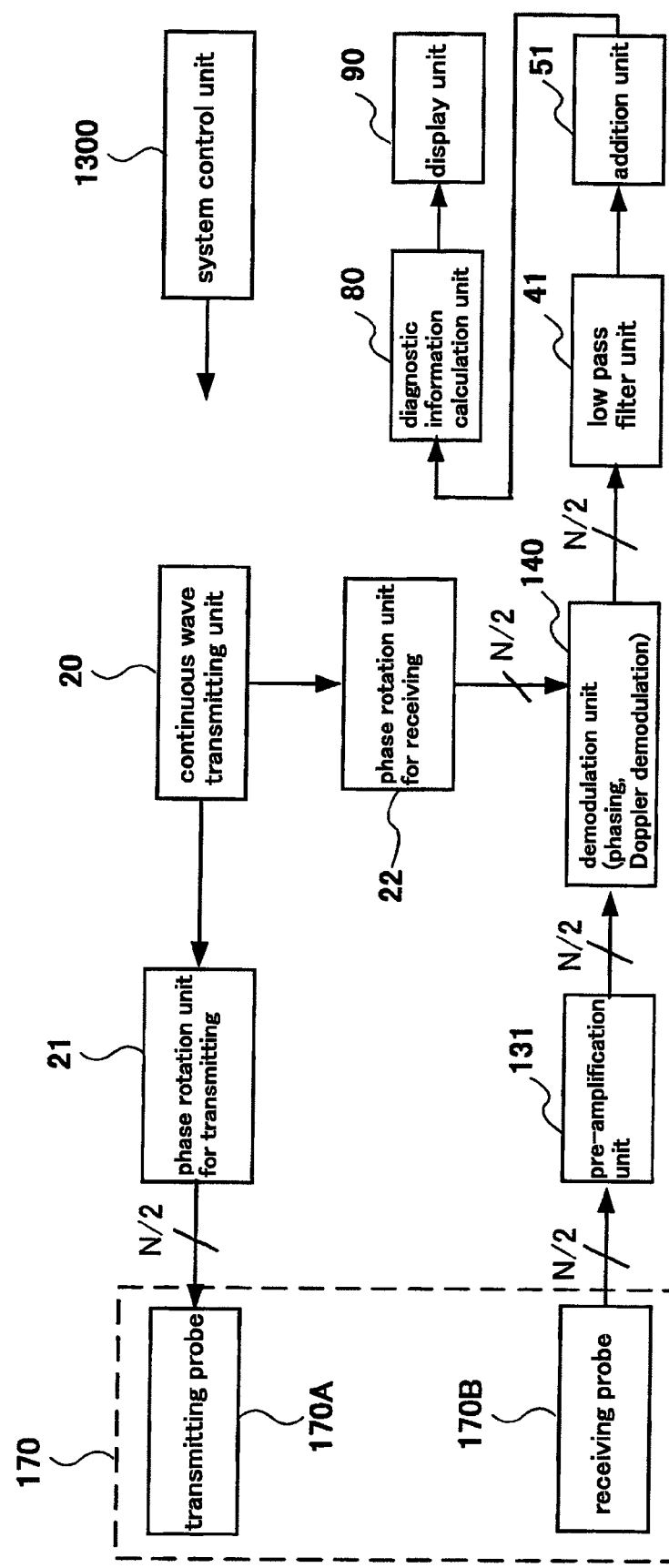
FIG. 8 A block diagram showing a configuration of a comparative example of ultrasonic diagnostic apparatus

10 . . . ultra sonic probe, 10A . . . transmitting probe, 10B . . . receiving probe, 10a . . . transmitting transducer, 10b . . . receiving transducer, 10c . . . transmitting/receiving transducer, 11-1 to 11-m . . . transducers, 12 . . . backing layer, 13 . . . matching layer, 14 . . . acoustic lens, 18 . . . drum, 18a . . . upper electrode, 18b . . . lower electrode, 18c . . . substrate, 18d . . . insulating film, 18e . . . hole, 18f . . . thin semiconductor film, 18g . . . wiring, 20 . . . continuous wave transmitting unit, 21 . . . phase rotation unit for transmitting, 22 . . . phase rotation unit for receiving, 23 . . . DC bias supply unit, 24 . . . modulated bias amplification unit, 31 . . . amplification unit, 41 . . . low pass filter unit, 51 . . . addition unit, 60 . . . receiving unit, 80 . . . diagnostic information calculation unit, 90 . . . display unit, 101 . . . condenser, 102, 102a and 102b . . . resistance, 103 . . . adder, 104 . . . bias voltage generating source, 105 . . . driving signal generating source, 111 . . . impedance, 300 . . . system control unit.

The invention claimed is:
1. An ultrasonic diagnostic apparatus, comprising an ultrasonic probe which transmits and receives ultrasonic waves to and from a subject to be examined, a transmitting unit for supplying driving signals for the ultrasonic probe, a receiving unit for processing received signals, which come from the subject and are outputted from the ultrasonic probe, and a display unit for displaying diagnostic information configured based on the received signals to be outputted from the receiving means regarding the subject,
wherein the ultrasonic probe consists of multiple transducers for transmitting and multiple transducers for receiving provided separately, the apparatus further comprises:
a continuous wave transmitting unit for generating a continuous wave,
a phase rotation unit for transmitting that rotates a phase of a continuous wave received from the continuous wave transmitting unit by a predetermined amount for each transducer for transmitting and supplies the phase-rotated wave to the transducer for transmitting as a driving signal,
a direct current (DC) bias supply unit for supplying a DC bias having a predetermined level to the transducer for transmitting,
a phase rotation unit for receiving that rotates a phase of a continuous wave received from the continuous wave transmitting unit by a predetermined amount for each transducer for receiving, and
a modulated bias amplifying unit provided between the phase rotation unit for receiving and the transducers for receiving,
wherein the modulated bias amplifying unit amplifies an amplitude of the continuous wave signal subjected to the phase rotation to supply a modulated-bias signal having a frequency identical with a frequency of the driving signal to the transducers for receiving.

2. The ultrasonic diagnostic apparatus according to claim 1, wherein the modulated bias amplifying unit sets a frequency band of the modulated bias voltage signals within a frequency bandwidth of the driving signals which are supplied by the transmitting unit to the ultrasonic probe.

3. The ultrasonic diagnostic apparatus according to claim 1, wherein each of the transducers performs Doppler demodulation at the time of receiving the received signals.

4. The ultrasonic diagnostic apparatus according to claim 1, wherein the phase rotation unit for receiving shifts a predetermined amount of phase of the modulated bias voltage signals for each of the transducers based on a focus position at a time of receiving.

5. The ultrasonic diagnostic apparatus according to claim 1, wherein the multiple transducers perform phasing processing at a time of receiving.

6. The ultrasonic diagnostic apparatus according to claim 1, wherein the transducers for transmitting and the transducers for receiving each include a pair of electrodes the ultrasonic probe is equipped with transducers, positioned with space in-between, at least one electrode of the pair is configured as displaceable, and the pair is connected with an output terminal and a bias terminal for applying bias voltage signal between the pair of electrodes.

7. The ultrasonic diagnostic apparatus according to claim 6, wherein each of the transducers has a receiving sensitivity which changes in time course and performs the Doppler demodulation processing in a process to convert ultrasonic signals to electric signals.

8. The ultrasonic diagnostic apparatus according to claim 1, wherein each of the transducers has a characteristic that its receiving sensitivity changes depending on a level of bias voltage to be applied.

* * * * *